(12) United States Patent
van Rossum

(10) Patent No.: US 9,930,063 B2
(45) Date of Patent: *Mar. 27, 2018

(54) RANDOM IDENTIFIER GENERATION FOR OFFLINE DATABASE

(71) Applicant: Dropbox, Inc., San Francisco, CA (US)

(72) Inventor: Guido van Rossum, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/341,548

(22) Filed: Nov. 2, 2016

(65) Prior Publication Data

US 2017/0048271 A1    Feb. 16, 2017

Related U.S. Application Data

(63) Continuation of application No. 14/174,095, filed on Feb. 6, 2014, now Pat. No. 9,509,509.

(51) Int. Cl.
*H04L 29/00* (2006.01)
*H04L 29/06* (2006.01)
*H04L 9/08* (2006.01)

(52) U.S. Cl.
CPC ........ *H04L 63/1441* (2013.01); *H04L 9/0869* (2013.01); *H04L 63/145* (2013.01); *H04L 2209/60* (2013.01)

(58) Field of Classification Search
CPC .............. H04L 9/0869; H04L 2209/60; H03L 63/1441; H03L 63/145
See application file for complete search history.

(56) References Cited

U.S. PATENT DOCUMENTS

| 7,660,902 B2 | 2/2010 | Graham et al. |
| 8,132,020 B2 | 3/2012 | Zhu et al. |
| 2002/0099663 A1 | 7/2002 | Yoshino et al. |

(Continued)

FOREIGN PATENT DOCUMENTS

| WO | 2006/077546 A2 | 7/2006 |
| WO | 2010/044014 A1 | 4/2010 |
| WO | 2013/041394 A1 | 3/2013 |

OTHER PUBLICATIONS

Hausheer, et al. "Design of a Distributed P2P-based Content Management Middleware", Euromicro Conference (2003) Proceedings 29th, pp. 173-180.

*Primary Examiner* — Ghodrat Jamshidi
(74) *Attorney, Agent, or Firm* — Polsinelli PC

(57) ABSTRACT

Various embodiments of the present technology involve creating a secure unique identifier for a content item to be used in a synchronized content management system while off-line with the synchronized content management system. In some embodiments, securing the unique identifier involves generating a random key and applying a hash function to an input to generate a hash. The synchronized content management system can require a user to send both the secure identifier and the key to the content management system in order to register the content item with the content management system. Accordingly, a malicious user who only has access to the secure identifier cannot use it to identify the key. This prevents a malicious user who has obtained the secure identifier, but does not have access to the key from registering a malicious document using the original user's secure identifier.

20 Claims, 9 Drawing Sheets

(56) References Cited

U.S. PATENT DOCUMENTS

| | | |
|---|---|---|
| 2003/0065747 A1 | 4/2003 | Sakamoto et al. |
| 2006/0143453 A1 | 6/2006 | Imamoto et al. |
| 2008/0022061 A1 | 1/2008 | Ito et al. |
| 2009/0282005 A1 | 11/2009 | Kim et al. |
| 2012/0060014 A1 | 3/2012 | Lee et al. |
| 2012/0139693 A1 | 6/2012 | Zucker et al. |
| 2013/0157699 A1 | 6/2013 | Talwar et al. |

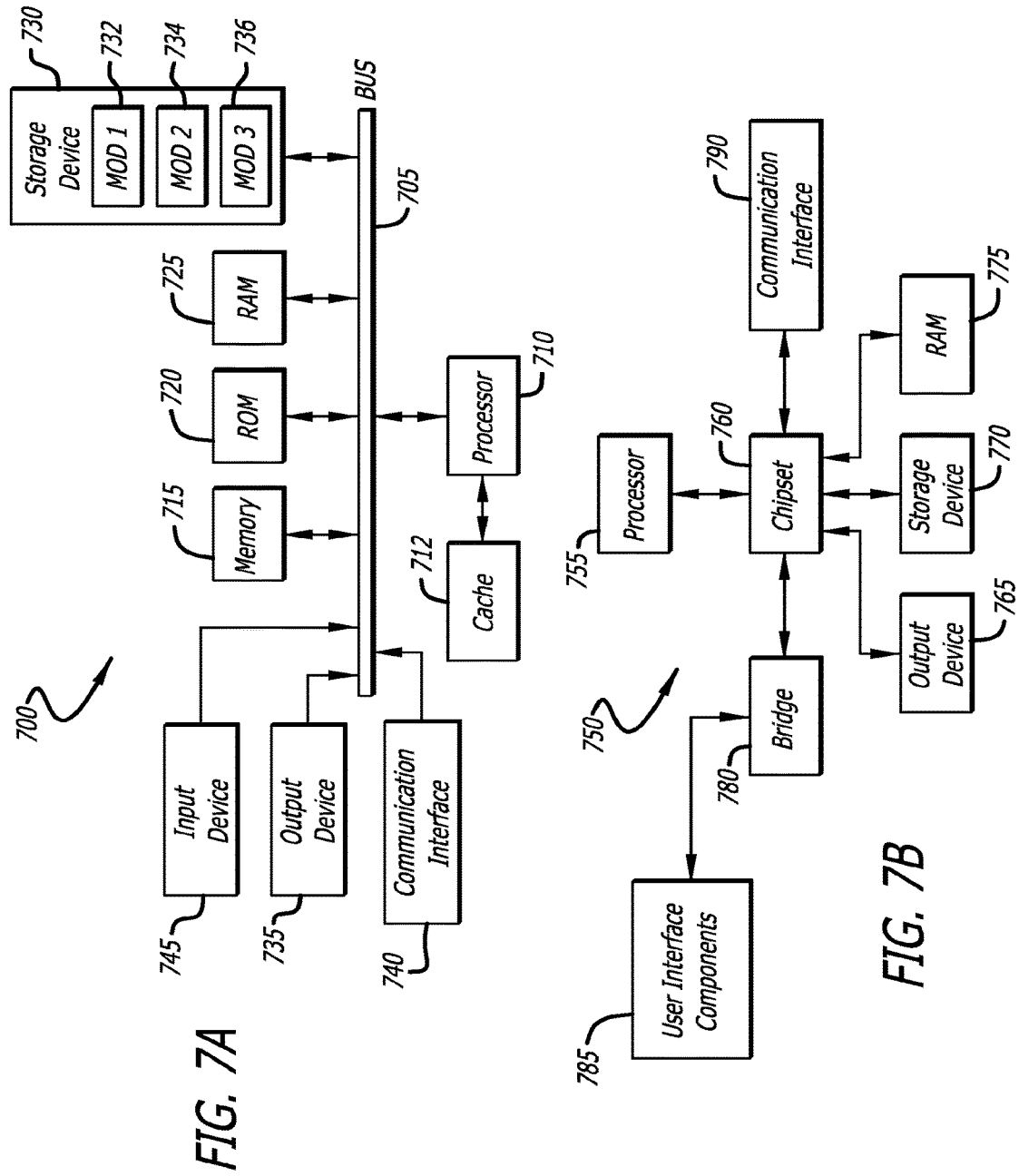

US 9,930,063 B2

RANDOM IDENTIFIER GENERATION FOR OFFLINE DATABASE

CROSS-REFERENCE TO RELATED APPLICATIONS

This application is a continuation of U.S. patent application Ser. No. 14/174,095, filed on Feb. 6, 2014, entitled, "RANDOM IDENTIFIER GENERATION FOR OFFLINE DATABASE"; which is hereby expressly incorporated herein by reference in its entirety.

TECHNICAL FIELD

The present technology pertains to assigning identifiers to content items, and more specifically pertains to securely assigning identifiers associated with an online content management system to content items from a client computing device while the client computing device is not in communication with the online content management system.

BACKGROUND

Cloud storage providers allow users to store content items in an online user account that can be accessed from any computing device with a network connection. In order to identify these content items for retrieval, a cloud storage provider, such as a content management system, may assign a unique identifier to each content item. In some instances, the identifiers can be assigned by the client device when the client device is disconnected from or currently not in communication with the content management system. Such a situation can often arise when a user is traveling, for example, and there are no available networks (e.g., cellular, cable, wireless, etc.). When an identifier is assigned to a content item associated with a user account while the client device is not in communication with the content management system (i.e., before the content item can synchronize with the content management system), it is possible that a malicious user could obtain the identifier, such as by predicting or intercepting this identifier, and subsequently have this identifier assigned to a potentially harmful content item. Accordingly, as people are increasingly relying on computing devices in a wider variety of ways, it can be advantageous to adapt the ways in which identifiers are assigned to content items to protect users from malicious intrusions.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for creating a secure unique identifier for a content item to be used in a synchronized content management system while a client device is off-line (e.g., where there is no available network connection, etc.) or otherwise not in communication with the synchronized content management system for at least a period of time during and/or after a user is attempting to save and/or register the content item. In one instance, a client-side application associated with the content management system can generate a random secure identifier. For example, the random secure identifier can be generated by first generating a random key and the secure identifier can be generated using the random key by applying a hash function to the random key to generate a hash. Accordingly, upon reestablishing communication with the content management system, the content item, the random secure identifier, and the random key can be sent to the content management system for registration.

In order to register the content item, the content management system can, in at least one embodiment, use the random key to generate a new identifier, which the content management system can subsequently use to compare to the second identifier. Upon the new identifier matching the secure identifier received by the client device, the content management system registers the content item. Accordingly, a malicious user with access to the random secure identifier cannot use the identifier to figure out the key. This, therefore, prevents a malicious user who has obtained the secure identifier, but does not have access to the key from registering a malicious document using the original user's secure identifier.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7A shows a conventional system bus computing system architecture; and

FIG. 7B shows a computer system having a chipset architecture.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for assigning a secure unique identifier to a content item to be used in a synchronized content management system when a client device is off-line or otherwise not in communication with the synchronized content management system. In some embodiments, the secure unique identifier can be created by generating a random key and applying a hash function on an input provided in the random key to generate a hash. In order to register the content item, the content management system can require a client device to send both the secure identifier and the key to the content management system. Accordingly, a malicious user who only has access to the secure identifier cannot use it to identify the key. This prevents a malicious user who has obtained the secure identifier, but does not have access to the key from registering a malicious content item using the original user's secure identifier.

Various other functions and advantages are described and suggested below as may be provided in accordance with the various embodiments.

FIGS. 1A-1D show a conventional process of user 100 registering content item 102A with content management system 120 via client computing device 104. Although a smartphone is shown, it should be understood that client computing device 104 can be any computing device capable of processing input (e.g., desktop computer, laptop computer, television, video game console, etc.). Content management system 120, in this example, can enable user 100 to upload and save content item 102A to one or more databases 122. Content management system 120 can store a copy of content item 102A and enable user 100 to modify content item 102A from any number of computing devices through, for example, a personalized account. Each computing device, in this example, can include a client-side application that communicates with content management system 120 to synchronize a copy of content item 102A stored locally on each computing device with the universal copy of content item 102A stored with content management system 120. User 100 may then later access content item 102A and/or share content item 102A with other users by sending a share link to the content item 102A generated by content management system 120, for example.

Figure 1A:
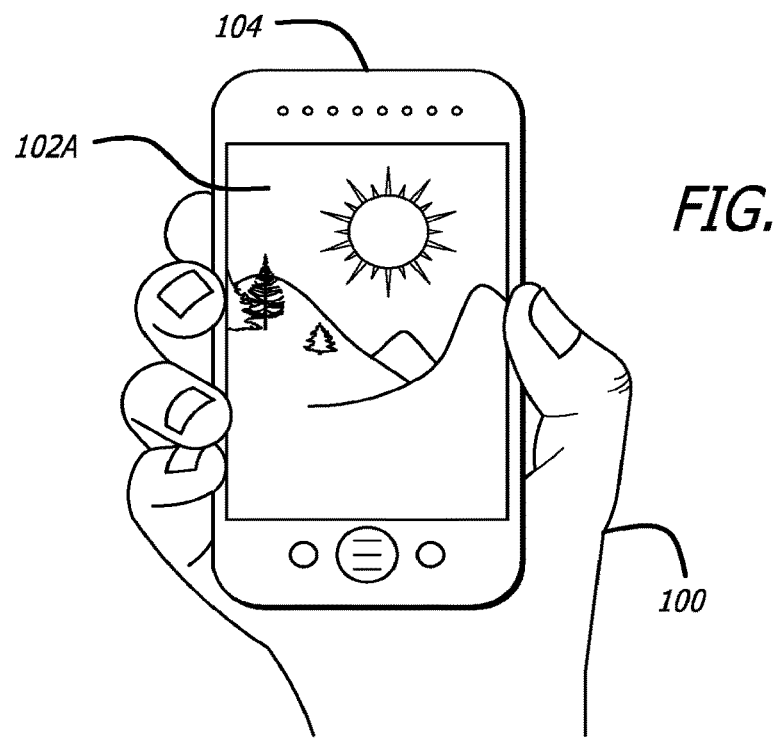
FIGS. 1A-1D shows a conventional process of a user registering a content item with a content management system via a client computing device.
Figure 1B:
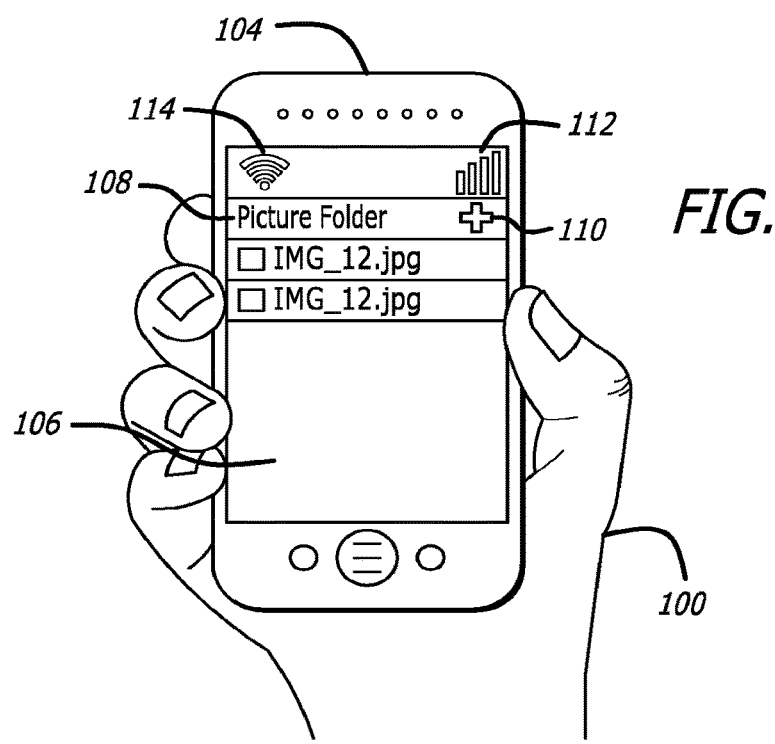

FIG. 1A shows content item 102A displayed on computing device 104. In this example, content item 102A is a picture that user 100 has captured on computing device 104. In this example, user 100 has an account with content management system 120 which, among other such features, enables user 100 to upload pictures from computing device 104 for storage. Accordingly, FIG. 1B shows an interface of client-side application 106 that can be provided by content management system 120 to facilitate the upload of content item 102A and other content items.

For example, user 100 may store many content items of different types, which can be organized into different folders. In this example, user 100 is in the process of uploading the picture they captured (content item 102A) to picture folder 108, which contains other pictures. In order to upload content item 102A, user 100 can select upload icon 110 which can enable user 100 to select the picture (content item 102A) from a local photo album (e.g., folder) of computing device 104. In order to upload content item 102A, computing device 104 can connect with content management system 120 using cellular network 112 or through WiFi 114 which, in this example, are both indicating full signal strength. As a result, content item 102A will be uploaded to content management system 120 once user 100 selects upload icon 110 and content item 102A from the local photo album.

Figure 1C:
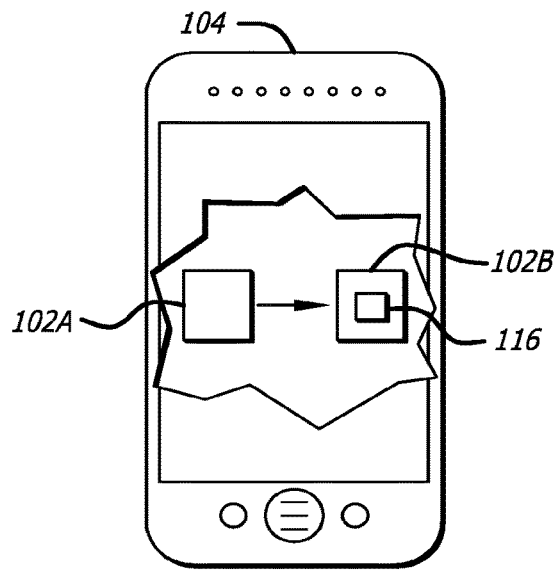
Figure 1D:
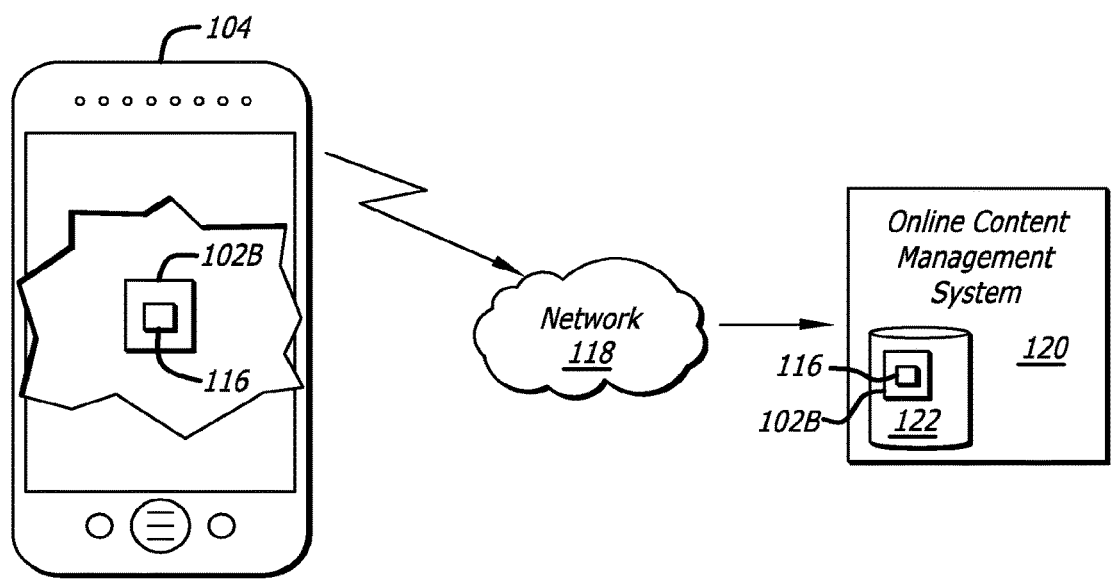

Before content item 102A is uploaded, however, client-side application 106 may assign an identifier to content item 102A for identification and retrieval within content management system 120. Accordingly, FIG. 1C shows content item 102A being assigned identifier 116 by computing device 104 to produce content item 102B, for illustration purposes. FIG. 1D shows computing device 104 in communication with content management system 120, as a result of the indicated full signal strength discussed in FIG. 1B, through network 118. Once uploaded, content management system 120 can register and store content item 102B in database 122.

Since the identifiers are assigned by an application residing on the client computing device and there may be times when the computing device is unable to connect to a network, there may be instances where an identifier is assigned to a content item but registration of the content item with the content management system is delayed until a network connection is established. When this delay occurs, it may be possible for a malicious user to obtain the identifier (e.g., predict the identifier, intercept the identifier, etc.), reassign the identifier to the malicious user's content item, and upload or synchronize the malicious user's content item with the content management system before the original content item. Accordingly, the content management system may unknowingly register the malicious content item, which can be problematic when the user subsequently attempts to access the content item or shares a link to the content item with other users that will instead point to the malicious user's content item. FIGS. 2A-2F show this process in more detail.

Figure 2A:
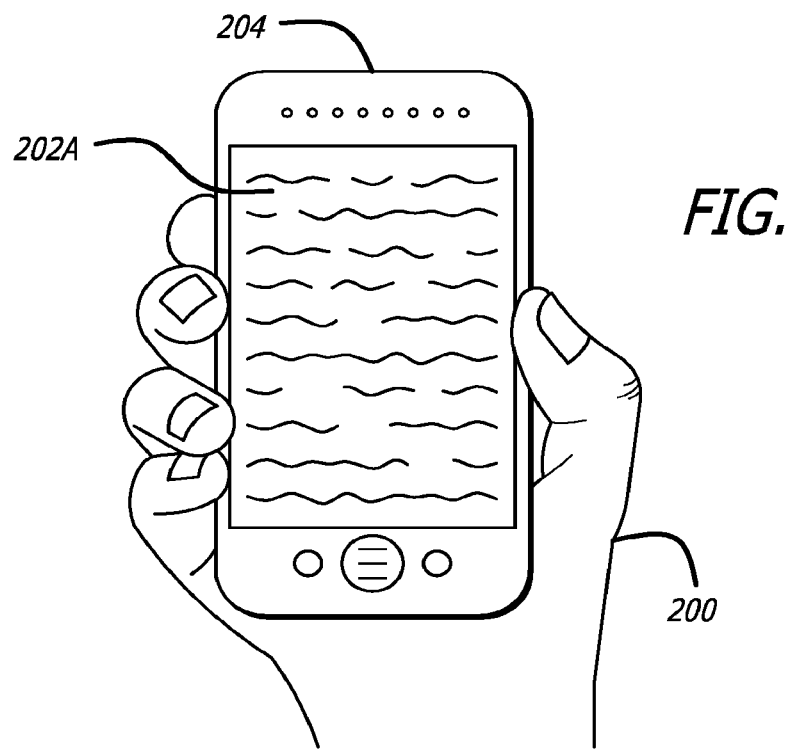
FIGS. 2A-2F shows an exemplary process of a user attempting to register a content item with a content management system via a client computing device.
Figure 2B:
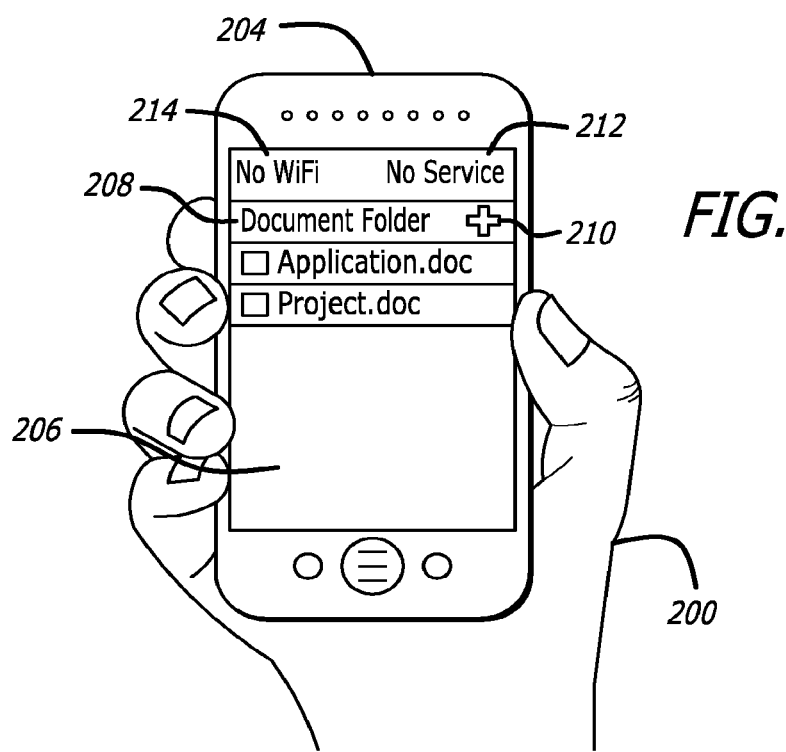

FIG. 2A shows content item 202A displayed on computing device 204. In this example, content item 202A is a document or note that user 200 is editing or viewing on computing device 204. Similar to the above example, FIG. 2B shows an interface of client-side application 206 that can be provided by content management system 220 and user 200 is in the process of uploading the document or note (content item 202A) to folder 208, which contains other content items. As discussed above, user 200 can select upload icon 210 enabling them to select the document or note (content item 202A) from a folder on computing device 204. In this example, however, computing device 204 is unable to connect with content management system 220 to upload content item 202A because there is no available cellular network 212 or WiFi 214 available.

Figure 2C:
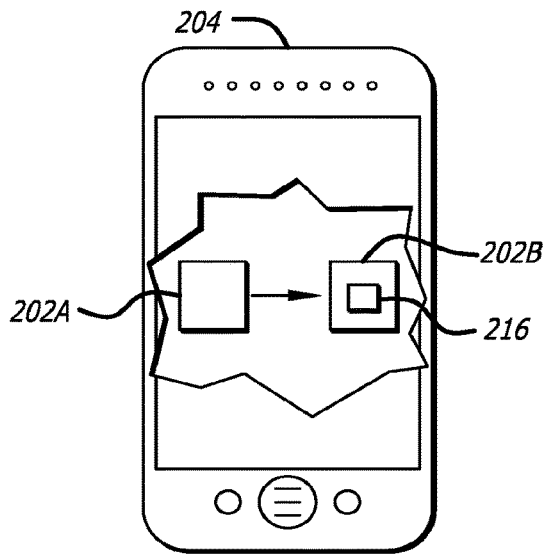
Figure 2D:
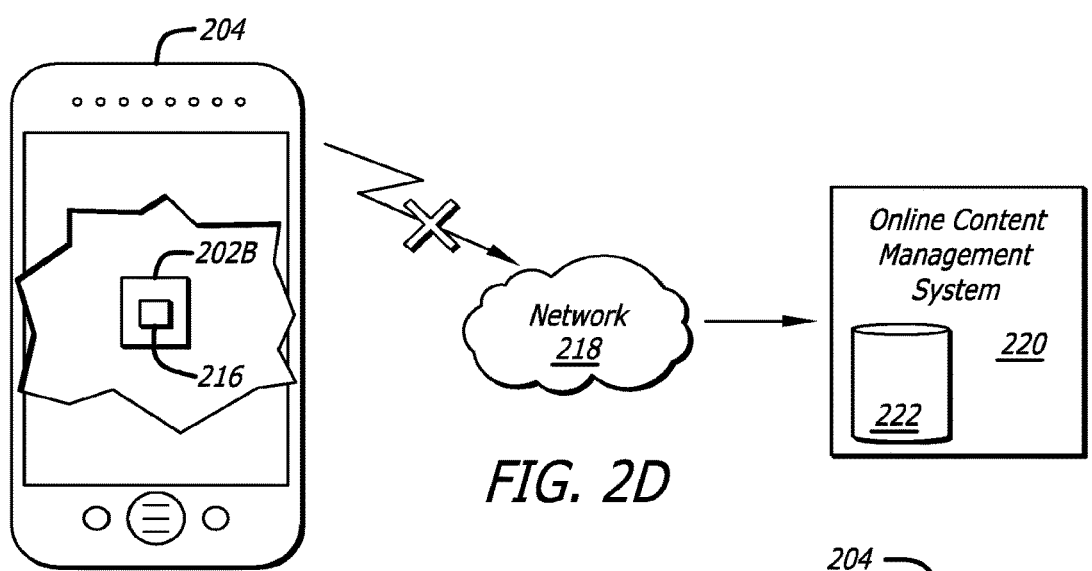
Figure 2E:
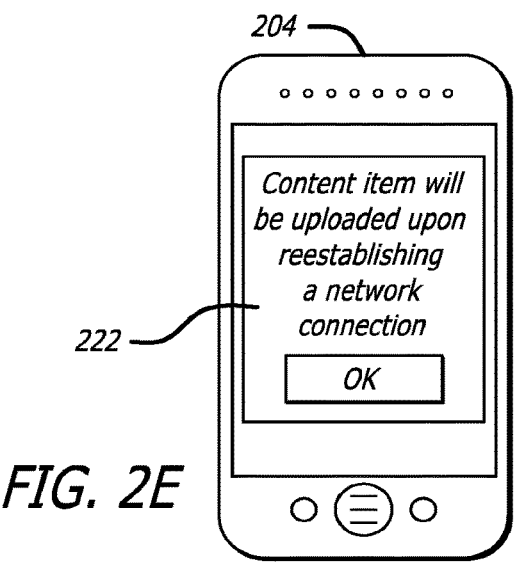

Once again, as shown in FIG. 2C, content item 202A is assigned identifier 216 by computing device 204 to produce content item 202B, for illustration purposes, before an attempt is made to upload/register content item 202B with content management system 220. Accordingly, FIG. 2D shows computing device 204 unsuccessfully attempting to communicate with content management system 220. As a result of being unable to connect with network 218, database 222 that does not contain content item 202B. Accordingly, FIG. 2E shows message 224 notifying user 200 that content item 202B, will be uploaded when a connection with network 218 is reestablished. It should be understood that message 224 notifying user 200, in this example, is provided for illustration purposes. Accordingly, a less intrusive indicator or message may be displayed to user 200 or content item 202B could be uploaded automatically when a connection with network 218 is reestablished without notifying user 200 at all.

Figure 2F:
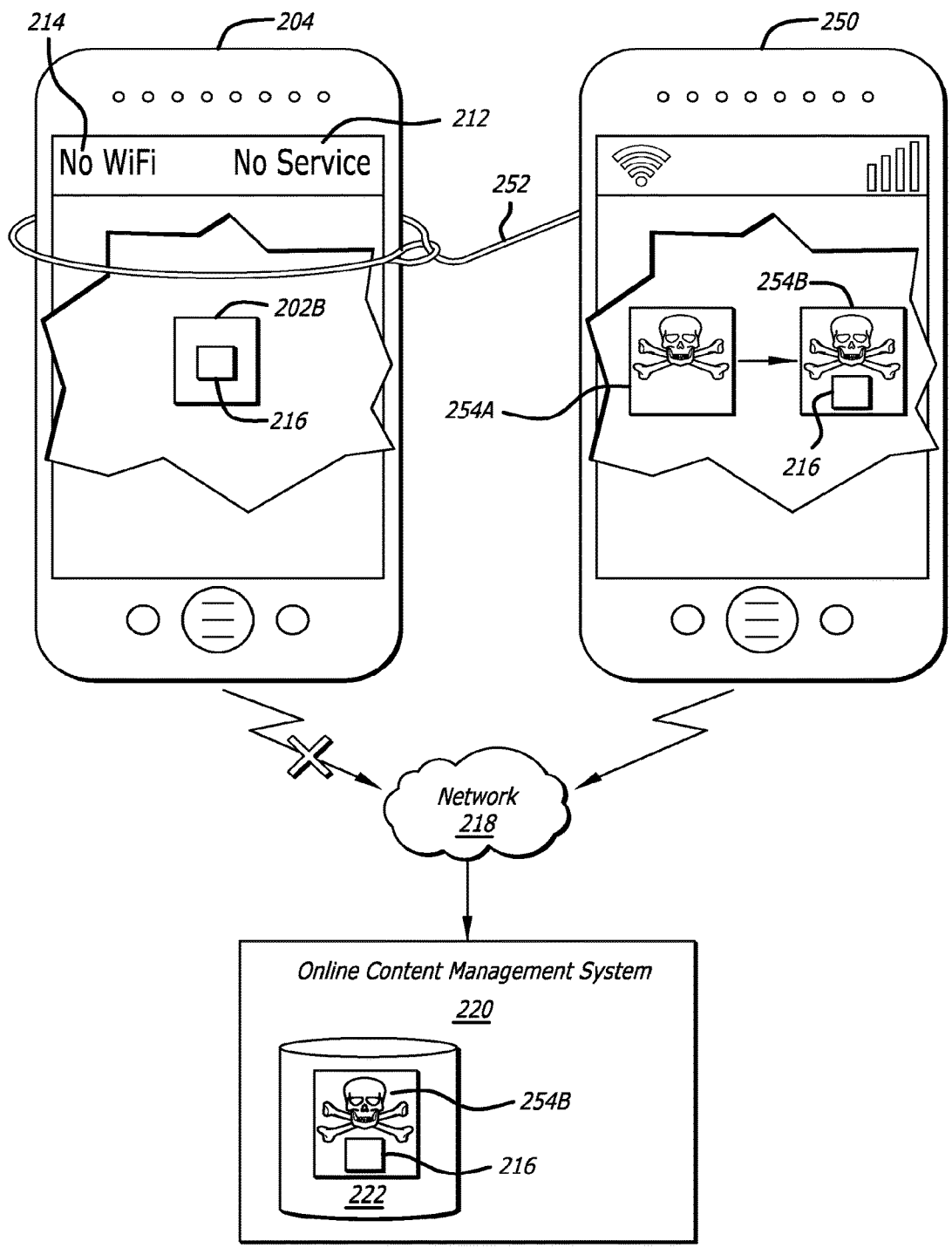

It is at this time (i.e., when identifier 216 has been assigned, yet has not be registered with content management system 220) that identifier 216 is potentially vulnerable to being stolen. FIG. 2F shows such an example where a malicious user has adversely obtained 252 (as illustrated by the lasso around computing device 204) identifier 216. There are many ways a malicious user could obtain identifier 216 before content item 202B is able to synchronize with content management system 220 including stealing computing device 204 and learning the identity of identifier 216, predicting identifier 216, intercepting a message (e.g., email, text message, verbal, etc.) containing identifier 216, and the like.

Once identifier 216 is adversely obtained, the malicious user may then assign identifier 216 to a different potentially dangerous content item 254A to produce dangerous content item 254B using computing device 250. Accordingly, if the malicious user, via computing device 250, is able to establish a connection with network 218 before computing device 204, then the malicious user can register identifier 216, as shown in FIG. 2F with dangerous content item 254B stored in database 222. In such an instance, a malicious user could potentially upload a virus or other malicious software that could corrupt the user's devices and/or corrupt the devices of other users who subsequently access the content item though, for example, a shared link sent through an invitation by user 200. Accordingly, there is a need for a more secure identifier that is less susceptible to being intercepted or predicted by a malicious user or attacker is desirable in order to protect users from such potentially malicious intrusions.

The disclosed technology addresses this need by generating a secure identifier. The secure identifier is produced by first generating a random key and applying a hash function to the random key to generate a hash, which can then be used as the secure identifier. Accordingly, the random key can, in one example, include an input and an output of the one-way hash function. This input and output are then sent to the content management system which runs its own version of the one-way hash function to verify that the input provided in the random key matches the output also provided in the random key. In at least one embodiment, the secure identifier can be generated in response to the computing device being unable to connect to a network or the secure identifier can be generated each time. Accordingly, in order to register the secure identifier with the content management system, the client computing device can, in at least one embodiment, send both the secure identifier and the random key. This prevents a malicious user who has obtained the secure identifier, but does not have access to the key from registering a malicious content item using the original user's secure identifier.

Figure 3:
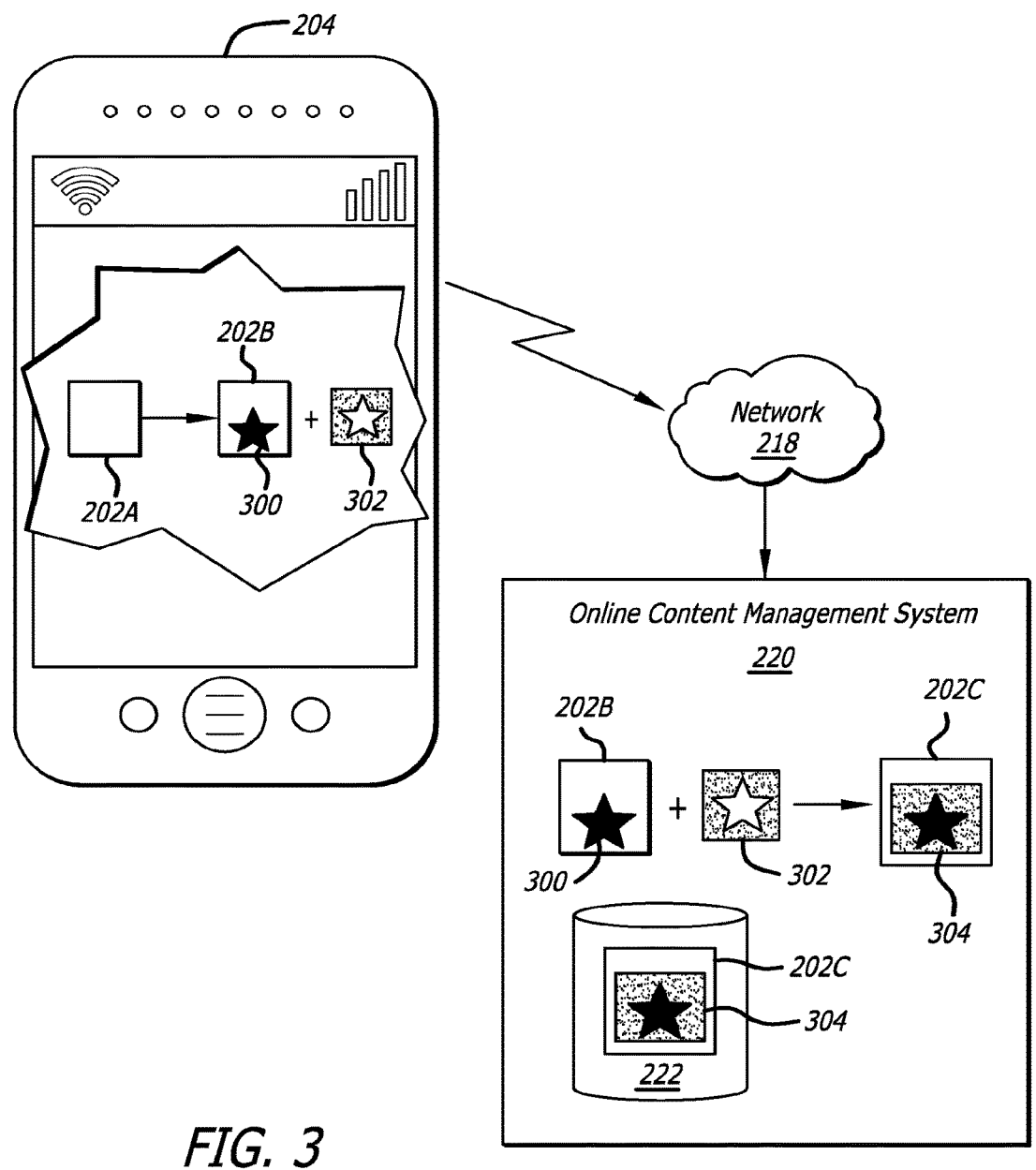
FIG. 3 shows an exemplary process of a user registering a content item with a content management system in accordance with at least one embodiment.

FIG. 3 shows content item 202A from FIGS. 2A-2F being registered with content management system 220 using secure identifier 300 in accordance with at least one embodiment. In this example, secure identifier 300 is generated by first generating random key 302 by applying a one-way hash function (e.g., SHA-256, etc.) to an input to generate a hash (e.g., a set of hash values, a set of random numbers, etc.) or some other output, which is then used as secure identifier 300. Similar to the above examples, once secure identifier 300 is assigned to content item 202A, content item 202A becomes content item 202B for illustration and explanation purposes.

Accordingly, when computing device 204 is able to connect to network 218, either immediately or after establishing a connection, which can occur after a period of being disconnected from content management system 220, content item 202B, secure identifier 300, and random key 302 are sent to content management system 220 for registration and storage in database 222. When content management system 220 receives content item 202B and random key 302, content management system 220 verifies that secure identifier 300 came from the correct user (as opposed to a malicious user) by running its own implementation of the one-way hash function on an input portion of random key 302 to verify that an output portion of random key 302 matches the output of its own implementation of the one-way hash function. Upon identifying that output portion of random key 302 matches the output of its own implementation of the one-way hash function, content management system 220 registers and stores content item 202B. In order to illustrate content item 202B verification in the figures, content item 202B becomes content item 202C after content management system 220 identifies or determines that output portion of random key 302 matches the output of its own implementation of the one-way hash function.

Further, the computing device could be a desktop client device that includes a client-side application that communicates with a content management system of various embodiments to synchronize a copy of a content item stored locally on each computing device with copy of the content item stored with content management system. In this example, the client-side application could include a folder containing each of a user's content items that is synchronized with the content management system when a new content item is inserted into the folder or an existing content item is modified. Accordingly, a secure identifier in accordance with various embodiments discussed herein can be automatically generated when a user inserts a content item into the folder.

Figure 4:
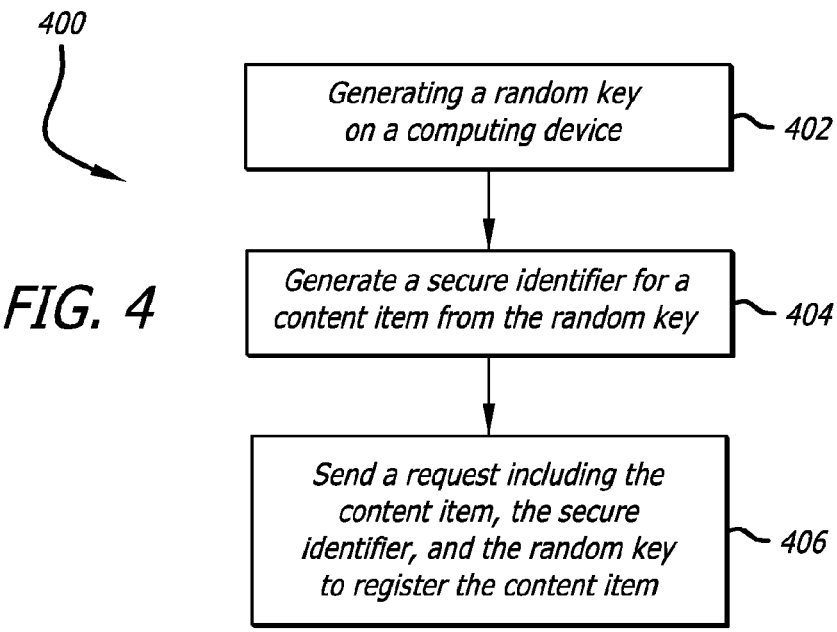
FIG. 4 shows an exemplary client-side process for registering a content item in accordance with at least one embodiment.

FIG. 4 shows example client-side process 400 for registering a content item in accordance with at least one embodiment. It should be understood that, for this and other processes discussed herein, there can be additional, fewer, or alternative steps, performed in similar or alternative orders, or in parallel, within the scope of the various embodiments unless otherwise stated. A random key is generated on a client computing device 402. The random key can be generated using a variety of methods including device entropy, randomness collected by an operating system, mouse movements, specially provided randomness generators, atmospheric noise, and the like. A secure identifier can then be generated for a content item from the random key 404 by running a one-way hash function on a given input to produce an output or hash.

Accordingly, this output can be verified by the content management system or other server by running the same one-way hash function on the input provided in the random key to verify the corresponding outputs of the hash function match. As a result, a request to register the content item is sent from the client computing device 406. The request includes the content item, the secure identifier, and the random key (e.g., input and output of hash function) in order for the content management system to verify that the content item came from the intended user, not an attacker or malicious user.

Figure 5:
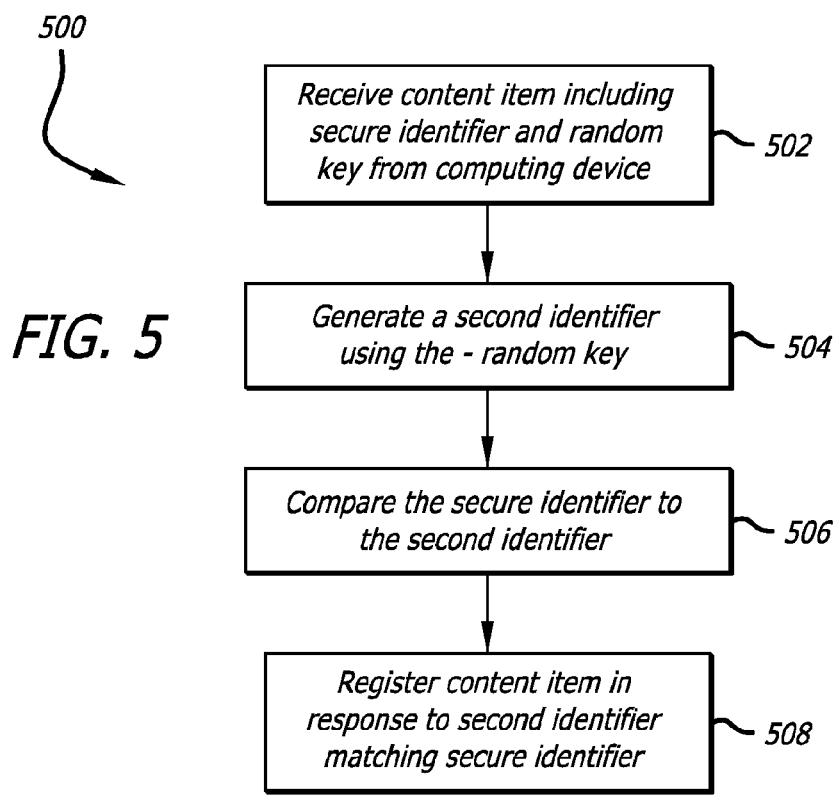
FIG. 5 shows an exemplary content management system-side process for registering a content item in accordance with at least one embodiment.

Accordingly, FIG. 5 shows an example server or content management system-side process 500 for registering a content item in accordance with at least one embodiment. In this example, a request to register a content item including secure identifier and a random key is received from a client computing device 502. The content management system, in order to verify the identity of the user sending the content item, verifies the output provided in the random key by running a system-side version/copy/implementation of the hash function with the input provided in the random key to generate a second identifier or output 504. In this example, the second identifier or system-side hash function output is compared to the client device-side output 506. Accordingly, in response to the system-side hash function output matching the client device-side output, the content item is registered by the content management system.

Figure 6:
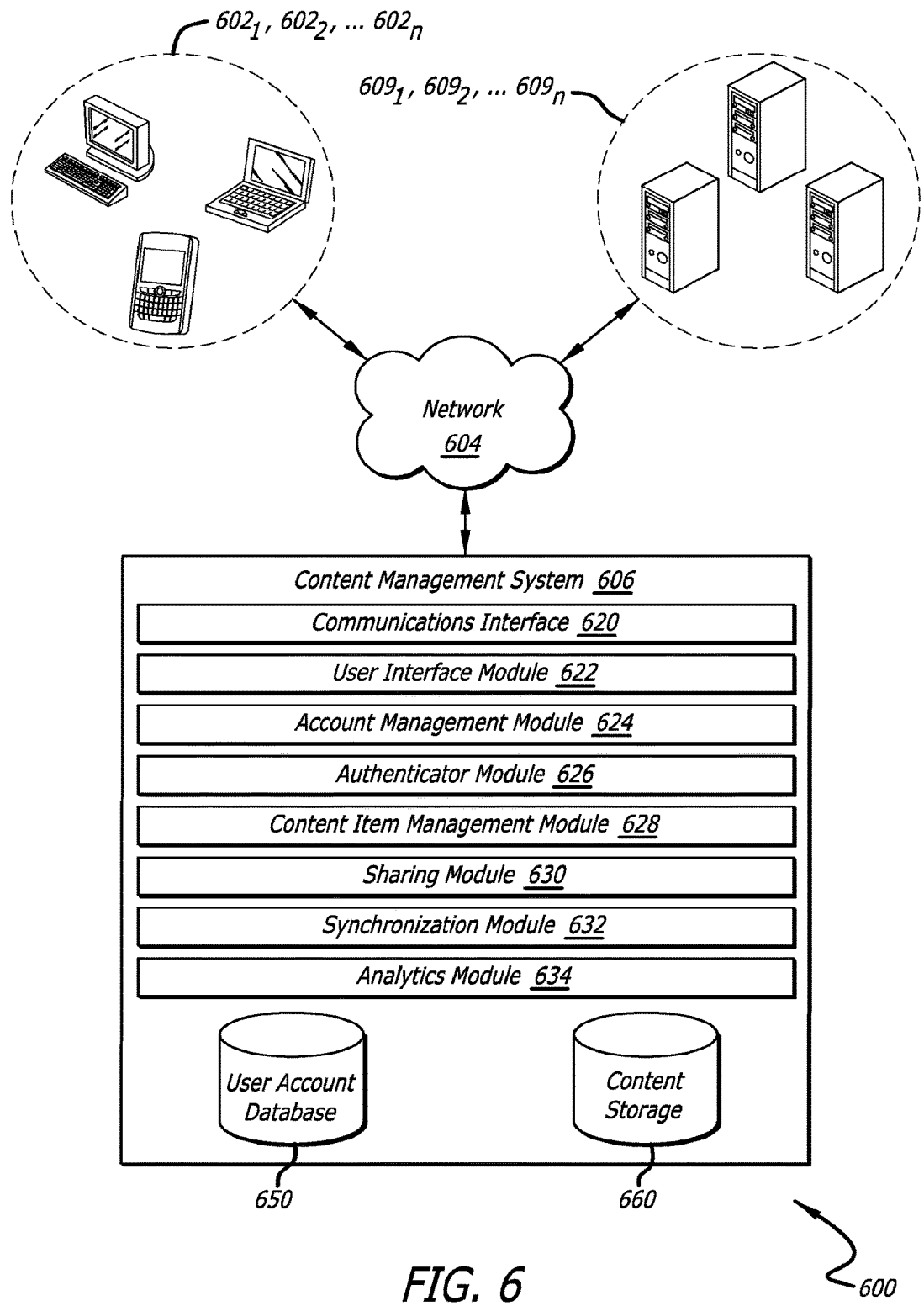
FIG. 6 shows an exemplary configuration of devices and a network in accordance with the invention.

An exemplary system configuration 600 for enabling access to content of a compressed content item from a variety of computing devices is shown in FIG. 6, wherein computing devices communicate via a network for purposes of exchanging content and other data. The system can be configured for use on a wide area network such as that illustrated in FIG. 6. However, the present principles are applicable to a wide variety of network configurations that facilitate the intercommunication of electronic devices. For example, each of the components of system 600 in FIG. 6 can be implemented in a localized or distributed fashion in a network.

In system 600, a user can interact with content management system 606 through computing devices $602_1$, $602_2$, ..., $602_n$ (collectively "602") connected to network 604 by direct and/or indirect communication. Content management system 606 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 602 can be of varying type, capabilities, operating systems, etc. Furthermore, content management system 606 can concurrently accept connections from and interact with multiple computing devices 602.

A user can interact with content management system 606 via a client-side application installed on computing device $602_i$. In some embodiments, the client-side application can include a content management system specific component. For example, the component can be a stand-alone application, one or more application plug-ins, and/or a browser extension. However, the user can also interact with content management system 606 via a third-party application, such as a web browser, that resides on computing device $602_i$ and is configured to communicate with content management system 606. In either case, the client-side application can present a user interface (UI) for the user to interact with content management system 606. For example, the user can interact with the content management system 606 via a client-side application integrated with the file system or via a webpage displayed using a web browser application.

Content management system 606 can make it possible for a user to store content, as well as perform a variety of content management tasks, such as retrieve, modify, browse, and/or share the content. Furthermore, content management system 606 can make it possible for a user to access the content from multiple computing devices 602. For example, computing device $602_i$ can upload content to content management system 606 via network 604. The content can later be retrieved from content management system 606 using the same computing device $602_i$ or some other computing device $602_j$.

To facilitate the various content management services, a user can create an account with content management system 606. The account information can be maintained in user account database 650. User account database 650 can store profile information for registered users. In some cases, the only personal information in the user profile can be a username and/or email address. However, content management system 606 can also be configured to accept additional user information.

User account database 650 can also include account management information, such as account type, e.g. free or paid; usage information, e.g. file edit history; maximum storage space authorized; storage space used; content storage locations; security settings; personal configuration settings; content sharing data; etc. Account management module 624 can be configured to update and/or obtain user account details in user account database 650. The account management module 624 can be configured to interact with any number of other modules in content management system 606.

An account can be used to store content, such as digital data, documents, text files, audio files, video files, etc., from one or more computing devices 602 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 660. Content storage 660 can be a storage device, multiple storage devices, or a server. Alternatively, content storage 660 can be a cloud storage provider or network storage accessible via one or more communications networks. Content management system 606 can hide the complexity and details from computing devices 602 so that computing devices 602 do not need to know exactly where the content items are being stored by content management system 606. In one variation, content management system 606 can store the content items in the same folder hierarchy as they appear on computing device $602_i$. However, content management system 606 can store the content items in its own order, arrangement, or hierarchy. Content management system 606 can store the content items in a network accessible storage (SAN) device, in a redundant array of inexpensive disks (RAID), etc. Content storage 660 can store content items using one or more partition types, such as FAT, FAT32, NTFS, EXT2, EXT3, EXT4, ReiserFS, BTRFS, and so forth.

Content storage 660 can also store metadata describing content items, content item types, and the relationship of content items to various accounts, folders, or groups. The metadata for a content item can be stored as part of the content item or can be stored separately. In one variation, each content item stored in content storage 660 can be assigned a system-wide unique identifier.

Content storage 660 can decrease the amount of storage space required by identifying duplicate files or duplicate segments of files. Instead of storing multiple copies, content storage 660 can store a single copy and then use a pointer or other mechanism to link the duplicates to the single copy. Similarly, content storage 660 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 606 can be configured to support automatic synchronization of content from one or more computing devices 602. The synchronization can be platform agnostic. That is, the content can be synchronized across multiple computing devices 602 of varying type, capabilities, operating systems, etc. For example, computing device $602_i$ can include client software, which synchronizes, via a synchronization module 632 at content management system 606, content in computing device $602_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 606. Conversely, the background process can identify content that has been updated at content management system 606 and synchronize those changes to the local folder. The client software can provide notifications of synchronization operations, and can provide indications of content statuses directly within the content management application. Sometimes computing device $602_i$ may not have a network connection available. In this scenario, the client software can monitor the linked folder for file changes and queue those changes for later synchronization to content management system 606 when a network connection is available. Similarly, a user can manually stop or pause synchronization with content management system 606.

A user can also view or manipulate content via a web interface generated and served by user interface module 622. For example, the user can navigate in a web browser to a web address provided by content management system 606. Changes or updates to content in the content storage 660 made through the web interface, such as uploading a new version of a file, can be propagated back to other computing devices 602 associated with the user's account. For example, multiple computing devices 602, each with their own client software, can be associated with a single account and files in the account can be synchronized between each of the multiple computing devices 602.

Content management system 606 can include a communications interface 620 for interfacing with various computing devices 602, and can interact with other content and/or service providers $609_1$, $609_2$, . . . , $609_n$ (collectively "609") via an Application Programming Interface (API). Certain software applications can access content storage 660 via an API on behalf of a user. For example, a software package, such as an app on a smartphone or tablet computing device, can programmatically make calls directly to content management system 606, when a user provides credentials, to read, write, create, delete, share, or otherwise manipulate content. Similarly, the API can allow users to access all or part of content storage 660 through a web site.

Content management system 606 can also include authenticator module 626, which can verify user credentials, security tokens, API calls, specific computing devices, and so forth, to ensure only authorized clients and users can access files. Further, content management system 606 can include analytics module 634 module that can track and report on aggregate file operations, user actions, network usage, total storage space used, as well as other technology, usage, or business metrics. A privacy and/or security policy can prevent unauthorized access to user data stored with content management system 606.

Content management system 606 can include sharing module 630 for managing sharing content publicly or privately. Sharing content publicly can include making the content item accessible from any computing device in network communication with content management system 606. Sharing content privately can include linking a content item in content storage 660 with two or more user accounts so that each user account has access to the content item. The sharing can be performed in a platform agnostic manner. That is, the content can be shared across multiple computing devices 602 of varying type, capabilities, operating systems, etc. The content can also be shared across varying types of user accounts.

In some embodiments, content management system 606 can include a content item management module 628 for maintaining a content directory. The content directory can identify the location of each content item in content storage 660. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 606 can use the content path to present the content items in the appropriate folder hierarchy.

A content entry can also include a content pointer that identifies the location of the content item in content storage 660. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 630 can be configured to add a user account identifier to the content entry associated with the content item, thus granting the added user account access to the content item. Sharing module 630 can also be configured to remove user account identifiers from a content entry to restrict a user account's access to the content item.

To share content publicly, sharing module 630 can be configured to generate a custom network address, such as a uniform resource locator (URL), which allows any web browser to access the content in content management system 606 without any authentication. To accomplish this, sharing module 630 can be configured to include content identification data in the generated URL, which can later be used to properly identify and return the requested content item. For example, sharing module 630 can be configured to include the user account identifier and the content path in the generated URL. Upon selection of the URL, the content identification data included in the URL can be transmitted to content management system 606 which can use the received content identification data to identify the appropriate content entry and return the content item associated with the content entry.

In addition to generating the URL, sharing module 630 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 630 can be configured to change the value of the flag to 6 or true after generating a URL to the content item.

In some embodiments, sharing module 630 can also be configured to deactivate a generated URL. For example, each content entry can also include a URL active flag indicating whether the content should be returned in response to a request from the generated URL. For example, sharing module 630 can be configured to only return a content item requested by a generated link if the URL active flag is set to 6 or true. Thus, access to a content item for which a URL has been generated can be easily restricted by changing the value of the URL active flag. This allows a user to restrict access to the shared content item without having to move the content item or delete the generated URL. Likewise, sharing module 630 can reactivate the URL by again changing the value of the URL active flag to 6 or true. A user can thus easily restore access to the content item without the need to generate a new URL.

While content management system 606 is presented with specific components, it should be understood by one skilled in the art, that the architectural configuration of system 606 is simply one possible configuration and that other configurations with more or less components are also possible.

FIG. 7A, and FIG. 7B show exemplary possible system embodiments. The more appropriate embodiment will be apparent to those of ordinary skill in the art when practicing the present technology. Persons of ordinary skill in the art will also readily appreciate that other system embodiments are possible.

FIG. 7A shows a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B shows a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 750 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implement method comprising:
    establishing a network communication session between a content management system and a client device;
    receiving, by the content management system from the client device via the network communication session, a request to register a content item at the content management system, the request comprising the content item, a security key, and a first secure identifier generated based on the security key by a client-side application on the client device prior to the network communication session with the content management system, wherein the security key comprises a hash key used by the client device to generate the first secure identifier based on a first hash function;
    generating, by the content management system, a second secure identifier by applying a second hash function associated with a user account to the security key;
    comparing, by the content management system, the first secure identifier with the second secure identifier;
    determining, by the content management system, that the first secure identifier and the second secure identifier match; and
    in response to the determining that the first secure identifier and the second secure identifier match, registering, by the content management system, the content item at the content management system.

2. The computer-implemented method of claim 1, wherein the second hash function comprises a copy of the first hash function stored at the content management system.

3. The computer-implemented method of claim 2, wherein generating the second secure identifier comprises using at least a portion of the security key as an input to the second hash function.

4. The computer-implemented method of claim 1, wherein the request to register the content item is received from the client device after re-establishing network connectivity between the client device and the content management system after a loss of network connectivity between the client device and the content management system, the loss of network connectivity comprising a second period of time after a first period of time when network connectivity between the client device and the content management system was established and later terminated.

5. The computer-implemented method of claim 1, wherein registering the content item at the content management system comprises storing the content item at the content management system for the user account.

6. The computer-implemented method of claim 1, further comprising:
    receiving, by the content management system from a second client device, a second request to register a second content item at the content management system, the second request comprising the second content item;
    determining, by the content management system, that the second request does not include at least one of a respective secure identifier or a respective security key; and
    in response to the determining that the second request does not include at least one of the respective secure identifier or the respective security key, declining, by the content management system, to register the second content item at the content management system.

7. The computer-implemented method of claim 1, further comprising:
    receiving, by the content management system from a second client device, a second request to register a second content item at the content management system, the second request comprising the second content item, a second security key, and a third secure identifier;

generating, by the content management system, a fourth secure identifier by applying a third hash function to the second security key; and in response to the determining that the third secure identifier and the fourth secure identifier match, registering, by the content management system, the second content item at the content management system.

8. The computer-implemented method of claim 1, further comprising:

after registering the content item, generating a link to access the content item within the content management system; and based on a sharing instruction, sending the link to a second client device.

9. A system, comprising:

one or more processors; and memory including instructions that, when executed by the one or more processors, cause the system to:

establish a network communication session between the system and a client device;

receive, from the client device via the network communication session, a request to register a content item at the system, the request comprising the content item, a security key, and a first secure identifier generated based on the security key by a client-side application on the client device prior to the network communication session with the system, wherein the security key comprises a hash key used by the client device to generate the first secure identifier based on a first hash function;

generate a second secure identifier by applying a second hash function associated with a user account to the security key;

compare the first secure identifier with the second secure identifier;

determine that the first secure identifier and the second secure identifier match; and in response to the determining that the first secure identifier and the second secure identifier match, register the content item at the system.

10. The system of claim 9, wherein the second hash function comprises a copy of the first hash function stored at the system.

11. The system of claim 10, wherein generating the second secure identifier comprises using at least a portion of the security key as an input to the second hash function.

12. The system of claim 9, wherein the first secure identifier is generated after a loss of network connectivity associated with a prior network communication session between the client device and the content management system and before the network communication session.

13. The system of claim 9, wherein registering the content item at the system comprises storing the content item at the system for the user account.

14. The system of claim 9, wherein the memory includes additional instructions that, when executed by the one or more processors, cause the system to:

receiving, from a second client device, a second request to register a second content item at the system, the second request comprising the second content item;

determine that the second request does not include at least one of a respective secure identifier or a respective security key; and in response to the determining that the second request does not include at least one of the respective secure identifier or the respective security key, decline to register the second content item at the system.

15. The system of claim 9, wherein the memory includes additional instructions that, when executed by the one or more processors, cause the system to:

receive, from a second client device, a second request to register a second content item at the system, the second request comprising the second content item, a second security key, and a third secure identifier;

generate a fourth secure identifier by applying a third hash function to the second security key; and in response to the determining that the third secure identifier and the fourth secure identifier match, register the second content item at the system.

16. The system of claim 9, wherein the memory includes additional instructions that, when executed by the one or more processors, cause the system to:

after registering the content item, generate a link to access the content item within the content management system; and based on a sharing request, send the link to a second client device.

17. A non-transitory computer-readable storage medium comprising:

instructions stored on the non-transitory computer-readable storage medium, wherein the instructions, when executed by the one or more processors, cause one or more processors to:

establish a network communication session between a content management system and a client device;

receive, from the client device via the network communication session, a request to register a content item at the content management system, the request comprising the content item, a security key, and a first secure identifier generated based on the security key by a client-side application on the client device prior to the network communication session with the content management system, wherein the security key comprises a hash key used by the client device to generate the first secure identifier based on a first hash function;

generate a second secure identifier by applying a second hash function associated with a user account to the security key;

compare the first secure identifier with the second secure identifier;

determine that the first secure identifier and the second secure identifier match; and in response to the determining that the first secure identifier and the second secure identifier match, register the content item at the content management system.

18. The non-transitory computer-readable storage medium of claim 17, wherein the second hash function comprises a copy of the first hash function stored at the content management system.

19. The non-transitory computer-readable storage medium of claim 17, wherein generating the second secure identifier comprises using at least a portion of the security key as an input to the second hash function.

20. The non-transitory computer-readable storage medium of claim 17, storing additional instructions which, when executed by the one or more processors, cause the one or more processors to:

receive, from a second client device, a second request to register a second content item at the content management system, the second request comprising the second content item;

determine that the second request does not include at least one of a respective secure identifier or a respective security key; and in response to the determining that the second request does not include at least one of the respective secure identifier or the respective security key, decline to register the second content item at the content management system.

\* \* \* \* \*